United States Patent [19]

Mansur, Jr.

[11] 4,219,818
[45] Aug. 26, 1980

[54] RADAR SYSTEM
[75] Inventor: George F. Mansur, Jr., Cedar Rapids, Iowa
[73] Assignee: Rockwell International Corporation, El Segundo, Calif.
[21] Appl. No.: 626,454
[22] Filed: Dec. 5, 1956
[51] Int. Cl.² .............................................. G01S 9/02
[52] U.S. Cl. ............................. 343/17.1 R; 343/7 PF
[58] Field of Search ..................... 343/17.1 R, 7 PF, 7

[56] References Cited
U.S. PATENT DOCUMENTS

| | | | |
|---|---|---|---|
| 2,446,244 | 8/1948 | Richmond | 343/5 |
| 2,494,339 | 1/1950 | Keister | 343/5 |
| 2,671,896 | 3/1954 | DeRosa | 343/17.1 |

*Primary Examiner*—T. H. Tubbesing
*Attorney, Agent, or Firm*—Richard W. Anderson

EXEMPLARY CLAIM

1. A radar system comprising means for radiating pulse-modulated electromagnetic energy, means for receiving said energy after reflection from a target, means for generating pulses, said generated pulses being applied to said radiating means for control of the radiated energy therefrom, near and far pulse gate generators each producing a pulse during a discrete time interval between successive pulses of said radiated energy and during which reflected energy may be received, said time intervals not exceeding the time corresponding to the maximum range of said radar system, said pulse generating means being coupled to said gate generators for triggering thereof, a pulse distributor, said pulse distributor being coupled to the output from said receiving means and to said gate generators whereby said pulse distributor applies said receiving means output occurring during one gate interval to one output line and that occurring during the other gate interval to another output line, a pair of averaging means, each said averaging means connected to one of said pulse distributor output lines, a differential amplifier receiving the outputs from each of said averaging means and supplying an output proportional to the differential amplitude therebetween, said amplifier being adapted to produce a zero output in the absence of reflected energy being received during either of said near and far gate intervals and in the presence of reflected energy during one of said gate intervals being adapted to produce an output having a finite value with a polarity indicative of which of the two said gate intervals is coincident with said reflected energy reception.

3 Claims, 3 Drawing Figures

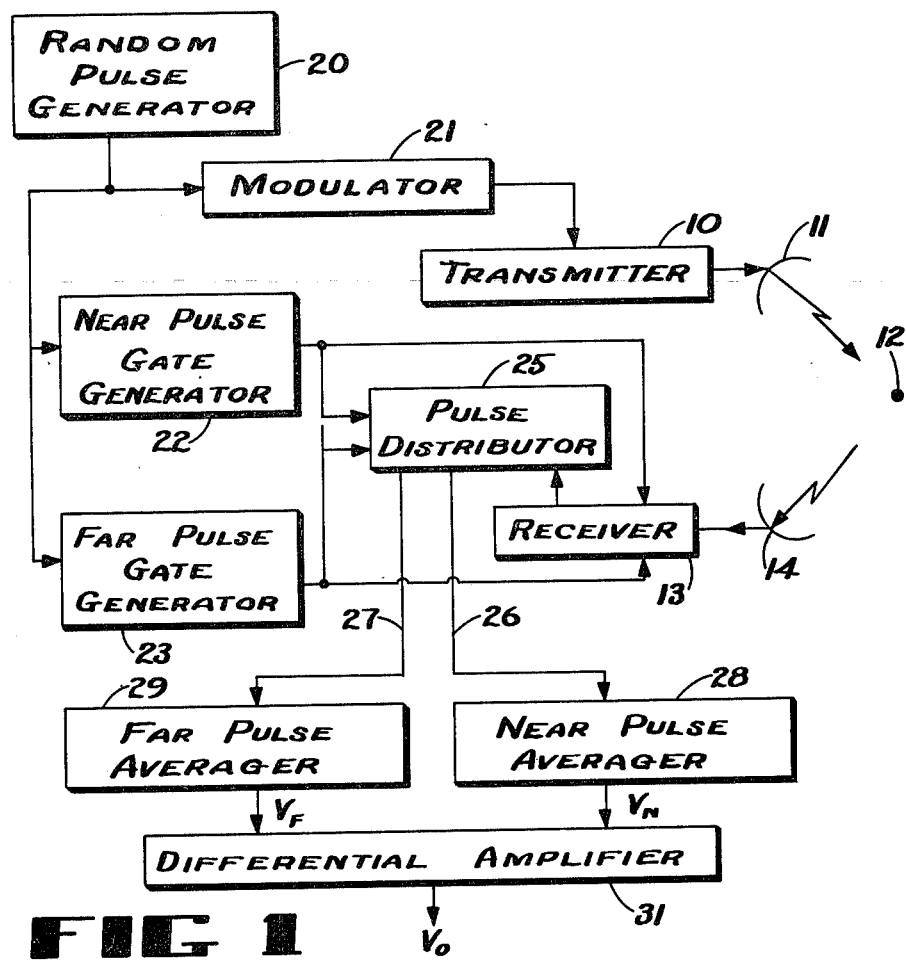
FIG 1
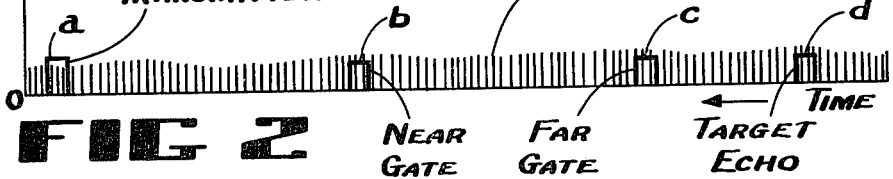
FIG 2
FIG 3

RADAR SYSTEM

This invention relates to radar systems and more particularly to systems operative despite the presence of noise jamming.

Prior art radar systems coping with jamming such as by random noise have utilized expected signal gates to reduce the noise signals present at the receiver output. Unfortunately, with high noise levels and a weak echo signal the echo signal is not distinguishable from the noise. Further, in applications where the radar system is used for proximity fuse applications, the presence of noise in such prior art devices renders them inoperative at a critical time.

It is an object of the invention to provide a radar system capable of operating in the presence of jamming signals.

It is a further object of the invention to provide a radar system capable of high sensitivity to weak return signals regardless of the background noise origin.

It is a feature of the invention that received noise and signals are integrated and the resultant handled mathematically to develop an itelligible returned signal.

It is a further feature that the system develops a receiver signal which is characteristic of the reception of an echo from either of two predetermined distances, with identification of which of the distances exists between transmitting and reflecting sources being determined by the polarity of the output signal from the system.

Further objects, features, and advantages of the invention will become apparent from the following description and claims when read in conjunction with the drawing in which:

FIG. 1 shows a block diagram of the invention.

FIG. 2 is a graph illustrating the operation of the system in the presence of noise, and FIG. 3 is a further graph showing the outputs of the channels and the derivation of the ultimate return signal.

In FIG. 1 a transmitter 10, capable of generating ultra-high-frequency power, is coupled to an antenna 11 adapted to radiate said power. Antenna 11 is arranged to direct or radiate electromagnetic energy toward a target. Target 12 is external to the system at hand and is at some varying range therefrom.

Receiver 13 is coupled to a receiving antenna 14 for the reception of energy reflected from target 12. Antenna 14 has similar directional characteristics to those of antenna 11. The bandwidth of the system must be wide enough to accommodate a reasonably square pulse being returned from the target 12.

In the transmitter chain a random pulse generator 20 originates pulses having random, unpredicted occurences. This generator is coupled to modulator 21. Pulses from the random pulse generator trigger the formation of rectangular pulses in modulator 21. The pulses generated by modulator 21 are amplitude-modulated on the carrier of transmitter 10, creating a random series of unpredictable radio frequency pulses. These pulses are radiated and directed by antenna 11 in a manner well known in the radar art.

Upon the presence of a target, some of the energy radiated is reflected. Receiving antenna 14 intercepts some of the reflected radiant energy and excites receiver 13 therewith.

In the receiver chain the same pulse output of the random pulse generator 20 is applied to two gate generators 22 and 23. These gate generators develop delayed pulses. Gate generator 22 forms a pulse sooner than gate generator 23. The generators are thus the near and far pulse generators, respectively, related to the distance covered by the radiated energy. Thus, generator 22 is adapted to make a shorter delay of its output pulse after a random pulse from generator 20. This delay is related to the near distance which the system is to indicate. Generator 23 is similarly adjusted to have a longer delay of its output pulse following a pulse from generator 20, similarly related to the far distance (relatively farther) to which the system is adjusted to indicate.

Gate generators 22 and 23 are one-shot multivibrators and are arranged to recycle to be ready for generating the next pulse before the minimum expected time of a pulse from random pulse generator 20. The width of the output pulses of the gate generators is wide enough to accept a somewhat degenerated returned signal appearing in the receiver. Output pulses from gate generators 22 and 23 are applied to receiver 13 for turning it on at times related to the expected return of a signal in the desired ranges.

Output pulses of gate generators 22 and 23 are also applied to pulse distributor 25. This distributor applies the output pulses of receiver 13 to lines 26 or 27 in accord to the relation of the signal to the gate generator. Line 26 is connected to near pulse averager 28 and line 27 is connected to far pulse averager 29. The pulse distributor switches the output of the receiver; if a near echo pulse occurs, it is applied to the near pulse averager 28 by way of pulse distributor 25 under control of the gate generator 22. An echo signal applied to receiver 13 related to the far distance to which the system is sensitive is applied through pulse distributor 25 and line 27 to far pulse averager 29. Any noise that is present at the receiver at these same times is also transmitted through the pulse distributor, for application to the pulse averagers.

Reference to FIG. 2 shows the transmitter pulse a corresponding to the pulse radiated by antenna 11. This transmitter pulse is substantially at the same time as the random pulse generated by the pulse generator 20. Pulses occurring in time related to the near and far gate generator pulses are b and c, respectively. A target echo d is shown as examplary of an echo coming in from an approaching target. As the target comes closer, the target echo d will move to the left closer to the origin of the time axis at the transmitter pulse a. If the target echo occurs at the same time as the far gate c, this echo will come through the system and be applied to the far pulse averager 29. Further approach of the target echo to the transmitter brings the target echo past the near gate time and thus a signal is applied to the near pulse averager 28.

FIG. 3 shows the operation of the pulse averagers. The pulse averagers 28 and 29 are integrating networks which take the average of the total signal applied to lines 26 and 27, respectively. The outputs $V_N$ and $V_F$ of the near and far pulse averagers, respectively, are shown in FIG. 3. Echo pulses occuring at both the near and far gates are shown. It is to be noted that the time axis in FIG. 3 is related to the over-all operation of the system in a macroscopic sense rather than from a start of the transmitter pulses, in a microscopic fashion, as in FIG. 2.

The two averaged outputs from the pulse averagers are applied to a differential amplifier 31. The output $V_0$ of the amplifier 31 is a difference of the two voltages applied to its input. This voltage is that of $V_O$ shown in FIG. 3. In this case the polarity of the pulses is arbitrarily taken such that the near output pulse is positive and the far output pulse is negative.

It is readily seen that as a pulse comes back from a target, the echo at the far distance will occur first in the far gate in voltage $V_F$ and in $V_O$; in $V_O$, since the outputs with extraneous noise are averaged and subtracted one from the other. Then a little later the near echo pulse comes through the system to appear in the average noise of $V_N$ and also in $V_O$. The system relies on the fact that noise in general is random and incoherent, so that when integrated and subtracted from a similar channel, a zero output results. A coherent signal, however, such as an echo, will not intergrate and subtract to yield a zero answer.

In application, the system can be used in a fuse in several manners. In one, the two distances sensed can be used to predict the proper firing time. In another, polarity sensitive devices can arm the fuse on the polarity related to the far echo and explode the fuse at the other polarity corresponding to the near echo.

Although this invention has been described with respect to particular embodiments thereof, it is not to be so limited because changes and modifications may be made therein which are within the full intended scope of the invention as defined by the appended claims.

I claim:

1. A radar system comprising means for radiating pulse-modulated electromagnetic energy, means for receiving said energy after reflection from a target, means for generating pulses, said generated pulses being applied to said radiating means for control of the radiated energy therefrom, near and far pulse gate generators each producing a pulse during a discrete time interval between successive pulses of said radiated energy and during which reflected energy may be received, said time intervals not exceeding the time corresponding to the maximum range of said radar system, said pulse generating means being coupled to said gate generators for triggering thereof, a pulse distributor, said pulse distributor being coupled to the output from said receiving means and to said gate generators whereby said pulse distributor applies said receiving means output occurring during one gate interval to one output line and that occuring during the other gate interval to another output line, a pair of averaging means, each said averaging means connected to one of said pulse distributor output lines, a differential amplifier receiving the outputs from each of said averaging means and supplying an output proportional to the differential amplitude therebetween, said amplifier being adapted to produce zero output in the absence of reflected energy being received during either of said near and far gate intervals and in the presence of reflected energy during one of said gate intervals being adapted to produce an output having a finite value with a polarity indicative of which of the two said gate intervals is coincident with said reflected energy reception.

2. A radar system comprising means for radiating radio frequency pulses, means for receiving reflected radiated energy, a pair of delayed gate-pulse generators triggered by said radiated pulses and producing first and second gate pulses during time intervals between successive ones of said radiated pulses and during which said reflected radiated energy may be received, said time intervals not exceeding the time corresponding to the maximum range of said radar system, distributor means connected to the output of said receiving means, said delayed gate generators having their outputs connected to gate said distributor means to produce a first distributor output during coincidence between the reception of reflected energy and said first gate pulse and a second distributor output during coincidence between the reception of reflected energy and said second gate pulse, a pair of intergrating networks, a differential amplifier, each of said pair of integrating networks connecting one of said outputs of said distributor to said differential amplifier, said differential amplifier producing an output proportional to the difference between the inputs thereto and of a polarity indicative of which of said inputs exceeds the other, the polarity of an output from said differential amplifier indicating the presence of the target at a distance related to the delay of a predetermined one of said gate generators.

3. A radar system comprising pulse transmitting means, receiving means, distributor means, a pulse generating means yielding a first pulse for actuating said transmitter means and second and third pulses delayed in time from said first pulse and between successive ones of said transmitted pulses at time intervals during which reflected energy may be received, said time intervals not exceeding the time corresponding to the maximum range of said radar system said second and third pulses actuating said distributor means, a pair of intergrating means, said distributor means selectively applying the output from said receiving means to one of said pair of integrating means during coincidence between said output and said second pulse and to the other of said pair of integrating means during coincidence between said output and said third pulse, differential amplifier means connected to the outputs of said pair of integrating means, said amplifier means producing an output indicative, by presence and polarity thereof, of a target at distances related to the delay time of said second and third pulses.

* * * * *